(12) United States Patent
Han et al.

(10) Patent No.: US 12,093,132 B2
(45) Date of Patent: Sep. 17, 2024

(54) METHOD, ELECTRONIC DEVICE, AND COMPUTER PROGRAM PRODUCT FOR ACCESSING DATA OF RAID

(71) Applicant: Dell Products L.P., Round Rock, TX (US)

(72) Inventors: Geng Han, Beijing (CN); Jianbin Kang, Beijing (CN); Jian Gao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 17/984,385

(22) Filed: Nov. 10, 2022

(65) Prior Publication Data

US 2023/0333929 A1    Oct. 19, 2023

(30) Foreign Application Priority Data

Apr. 15, 2022 (CN) .......................... 202210399932.2

(51) Int. Cl.
*G06F 11/10* (2006.01)
*G06F 11/07* (2006.01)

(52) U.S. Cl.
CPC ...... *G06F 11/1084* (2013.01); *G06F 11/0772* (2013.01); *G06F 11/0775* (2013.01); *G06F 11/1092* (2013.01)

(58) Field of Classification Search
CPC ............. G06F 11/1084; G06F 11/0772; G06F 11/0775; G06F 11/1092

USPC ......................................................... 714/6.2
See application file for complete search history.

(56) References Cited

U.S. PATENT DOCUMENTS

| | | | |
|---|---|---|---|
| 5,574,855 A | 11/1996 | Rosich et al. | |
| 10,628,075 B1 | 4/2020 | Samad et al. | |
| 11,262,920 B2 | 3/2022 | Dalmatov et al. | |
| 11,281,527 B2 | 3/2022 | Xu et al. | |
| 2011/0302446 A1* | 12/2011 | Becker-Szendy | G06F 11/1076 714/6.1 |

* cited by examiner

*Primary Examiner* — Yair Leibovich
(74) *Attorney, Agent, or Firm* — BainwoodHuang

(57) ABSTRACT

Techniques for accessing data involve reading data from at least one disk among a plurality of disks. Such techniques further involve detecting whether a lookup table stored on a memory is empty, where the lookup table stores information indicating data loss. Such techniques further involve comparing, in response to the lookup table not being empty, data read information associated with the read data with table items in the lookup table to determine whether there is a table item in the lookup table that matches the data read information. Such techniques further involve sending, in response to determining that there is a table item that matches the data read information, the information indicating data loss. Such a technique improve the efficiency of data access, reduces the complexity of the system and the power consumption of the system, and improves the performance of the system.

21 Claims, 6 Drawing Sheets

METHOD, ELECTRONIC DEVICE, AND COMPUTER PROGRAM PRODUCT FOR ACCESSING DATA OF RAID

CROSS-REFERENCE TO RELATED APPLICATION

This application claims priority to Chinese Patent Application No. CN202210399932.2, on file at the China National Intellectual Property Administration (CNIPA), having a filing date of Apr. 15, 2022, and having "DATA ACCESSING METHOD, ELECTRONIC DEVICE, AND COMPUTER PROGRAM PRODUCT FOR RAID" as a title, the contents and teachings of which are herein incorporated by reference in their entirety.

TECHNICAL FIELD

Embodiments of the present disclosure relate to the field of computer processing, and more specifically relate to a method, an electronic device, and a computer program product for accessing data of a redundant array of independent disks (RAID).

BACKGROUND

In a storage system based on a redundant array of independent disks (RAID), when one disk fails, the RAID may restore data in the failed disk using data in other disks. This process is generally referred to as rebuilding. However, some data on other disks may also have problems in the rebuilding process. In this case, some data in the failed disk cannot be effectively restored, thereby resulting in data loss. For data accessing to the storage system, if the data loss situation can be easily known during data accessing, it will bring great convenience to the data accessing operation and improve the efficiency of the data accessing operation.

SUMMARY OF THE INVENTION

Embodiments of the present disclosure provide a method, an electronic device, and a computer program product for accessing data of a redundant array of independent disks (RAID).

According to a first aspect of the present disclosure, a method for accessing data of a redundant array of independent disks (RAID) is provided, where the redundant array of independent disks includes a plurality of disks, the plurality of disks are associated with a data accessing device, and the method for accessing data may be executed by the data accessing device. The method for accessing data includes reading data from at least one disk among a plurality of disks. The method for accessing data further includes detecting whether a lookup table stored on a memory is empty, where the lookup table stores information indicating data loss. The method for accessing data further includes comparing, in response to the lookup table not being empty, data read information associated with the read data with table items in the lookup table to determine whether there is a table item in the lookup table that matches the data read information. The method further includes sending, in response to determining that there is a table item that matches the data read information, the information indicating data loss.

According to a second aspect of the present disclosure, an electronic device for accessing data of a redundant array of independent disks (RAID) is provided, where the redundant array of independent disks includes a plurality of disks, and the plurality of disks are associated with the electronic device. The electronic device includes at least one processor; and a memory coupled to the at least one processor and having instructions stored thereon, where the instructions, when executed by the at least one processor, cause the device to execute actions, and the actions include: reading data from at least one disk among the plurality of disks; detecting whether a lookup table stored on a memory is empty, the lookup table storing information indicating data loss; comparing, in response to the lookup table not being empty, data read information associated with the read data with table items in the lookup table to determine whether there is a table item in the lookup table that matches the data read information; and sending the information indicating data loss in response to determining that there is a table item that matches the data read information.

According to a third aspect of the present disclosure, a computer program product is provided. The computer program product is tangibly stored on a non-volatile computer-readable medium and includes machine-executable instructions. The machine-executable instructions, when executed, cause a machine to execute steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where the same reference numerals generally represent the same components in the example embodiments of the present disclosure.

The same or corresponding reference numerals in the figures represent the same or corresponding portions.

DETAILED DESCRIPTION

Figure 1:
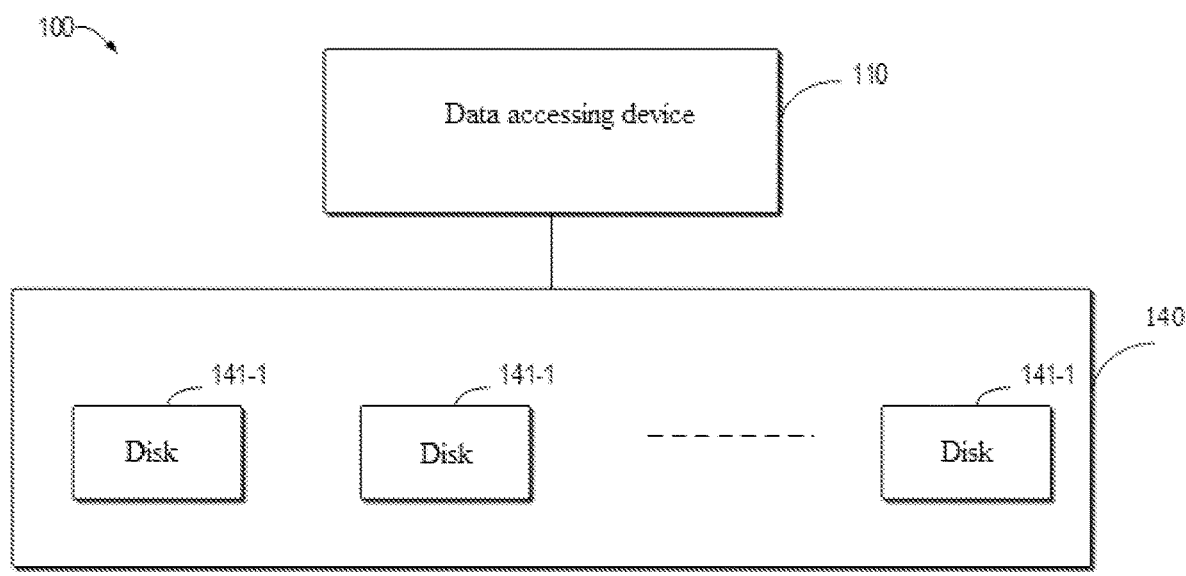
FIG. 1 shows a schematic diagram of example environment 100 in which a device and/or a method according to an embodiment of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more detail below with reference to the accompanying drawings. Some embodiments of the present disclosure are shown in the accompanying drawings. However, it should be understood that the present disclosure may be implemented in various forms, and should not be construed as being limited to the embodiments set forth herein. On the contrary, these embodiments are provided to more thoroughly and completely understand the present disclosure. It should be understood that the accompanying drawings and embodiments of the present disclosure are only used as examples, and are not intended to limit the scope of protection of the present disclosure.

In the description of the embodiments of the present disclosure, the term "including" and similar wordings thereof should be construed as open-ended inclusions, i.e., "including but not limited to." The term "based on" should be construed as "at least partially based on." The term "an embodiment" or "the embodiment" should be construed as "at least one embodiment." The terms "first", "second", and the like may refer to different or identical objects. Other explicit and implicit definitions may be further included below.

In a storage system based on a redundant array of independent disks (RAID), when one disk fails, the RAID may restore data in the failed disk using data in other disks. This process is generally referred to as rebuilding. However, some data on other disks may also have problems in the rebuilding process. In this case, some data in the failed disk will be lost because it cannot be recovered effectively. For data accessing to the storage system, if the data loss situation can be easily known during data accessing, it will bring great convenience to the data accessing operation and improve the efficiency of the data accessing operation.

The storage system based on a redundant array of independent disks (RAID) generally includes a mapper module and a RAID module. The mapper module is configured to establish a storage mapping mechanism from a logical storage space to a physical storage space at a small granularity (for example, 4 KB). The RAID module distributes data to disks at a relatively large granularity (e.g., GB-level granularity) based on the mapping mechanism from the mapper module, and protects data by some column algorithms. In the prior art, for data loss occurring in the rebuilding process, the RAID module usually sends a notification to the mapper module; the mapper module records the data loss, restores problematic data, and writes it into another storage area. Then, the mapper module informs the RAID module to proceed with the rebuilding, thereby facilitating subsequent data accessing. However, since the RAID module needs to cooperate with the mapper module to record data loss, such design is too complex, and in some cases (for example, when the mapper module is inactive), the data rebuilding period will be prolonged, and the rebuilding efficiency will be reduced.

In the prior art, there is another method of recording data loss for data access. In this method, for a slice of a disk with data lost, a fixed template (know bad pattern) is used in the slice to identify the lost data to indicate that there is lost data in the slice. Every time when reading data from a disk, the RAID module needs to compare retrieved data with the fixed template to check whether the retrieved data matches the fixed template. If the retrieved data matches the fixed template, it indicates that the retrieved data identifies the lost data, and there is data loss; and if the retrieved data does not match the fixed template, it indicates that the retrieved data is correct data. However, in this method, the RAID module needs to perform a template comparing operation on data retrieved each time, thereby resulting in very low data accessing efficiency and seriously affecting the performance of the data accessing system.

At least in order to solve the above and other potential problems, an embodiment of the present disclosure presents a method for accessing data of a redundant array of independent disks (RAID), where the redundant array of independent disks includes a plurality of disks, the plurality of disks are associated with a data accessing device, and the method for accessing data is executed by the data accessing device. In the method for accessing data, the data accessing device reads data from at least one disk among the plurality of disks. Then, the data accessing device detects whether a lookup table stored on a memory is empty, where the lookup table stores information indicating data loss. In response to the lookup table not being empty, the data accessing device compares data read information associated with the read data with table items in the lookup table to determine whether there is a table item in the lookup table that matches the data read information. The data accessing device sends, in response to determining that there is a table item that matches the data read information, the information indicating data loss. With this method, the recording of data loss may be independently executed only by the RAID module in the data accessing device, thereby simplifying the operation of recording the data loss and improving the efficiency of data accessing.

Embodiments of the present disclosure will be further described in detail below with reference to the accompanying drawings, where FIG. 1 shows a schematic diagram of example environment 100 in which the embodiments of the present disclosure can be implemented.

Example environment 100 includes data accessing device 110 and disk array 140. Disk array 140 includes a plurality of disks 141-$i$ ($1 \le i \le N$, where i is a positive integer). As used herein, the "disk" may refer to any non-volatile storage medium that is known at present or will be developed in the future, including but not limited to a magnetic disk, an optical disk, a solid-state disk (SSD), and the like, which will be collectively referred to as "disk" for description in the description herein. However, it should be understood that this is only for ease of description, and does not imply any limitation to the scope of the present disclosure. Those skilled in the art may select a suitable non-volatile storage medium based on application requirements. In an embodiment, disk array 140 may include a redundant array of independent disks (RAID), which generally combines a plurality of physical storage units into a logical storage unit for purpose of data redundancy backup and/or performance improvement, and may be of different types, such as RAID 0, RAID 1, . . . , and RAID 5 depending on the desired redundancy and performance level.

Data accessing device 110 is configured to access a plurality of disks in disk array 140. Data accessing device 110 may include a processor and a memory. In an embodiment, when disk array 140 includes a redundant array of independent disks (RAID), a RAID module may run on the processor of data accessing device 110, and the RAID module is configured to manage disk array 140 (e.g., data accessing and data rebuilding).

The memory of data accessing device 110 according to the embodiment of the present disclosure stores a lookup table, where the lookup table stores information indicating data loss. When the RAID module accesses data in disk array 140, the RAID module determines whether it is necessary to further determine whether there is lost data based on whether the lookup table is empty. When the lookup table is empty, the RAID module determines that read data is correct, and may directly send the data to an upper-level processing device for processing. Only when the lookup table is not empty, does the RAID module need to further determine whether there is lost data. Since it is not necessary to perform template comparison every time when data is accessed, the method for accessing data according to the embodiment of the present disclosure can improve the efficiency of data accessing. In addition, the lookup table may be recorded by the RAID module in the rebuilding process without the involvement of other modules. Therefore, the method for accessing data according to the embodiment of the present disclosure can be independently completed by the RAID, thereby reducing the complexity of the system, reducing the power consumption of the system, and improving the performance of the system.

A block diagram of example system 100 in which embodiments of the present disclosure can be implemented is described above with reference to FIG. 1. Example system 200 in which embodiments of the present disclosure can be implemented is described below with reference to FIG. 2. Example system 200 is a detailed block diagram of example system 100.

Figure 2:
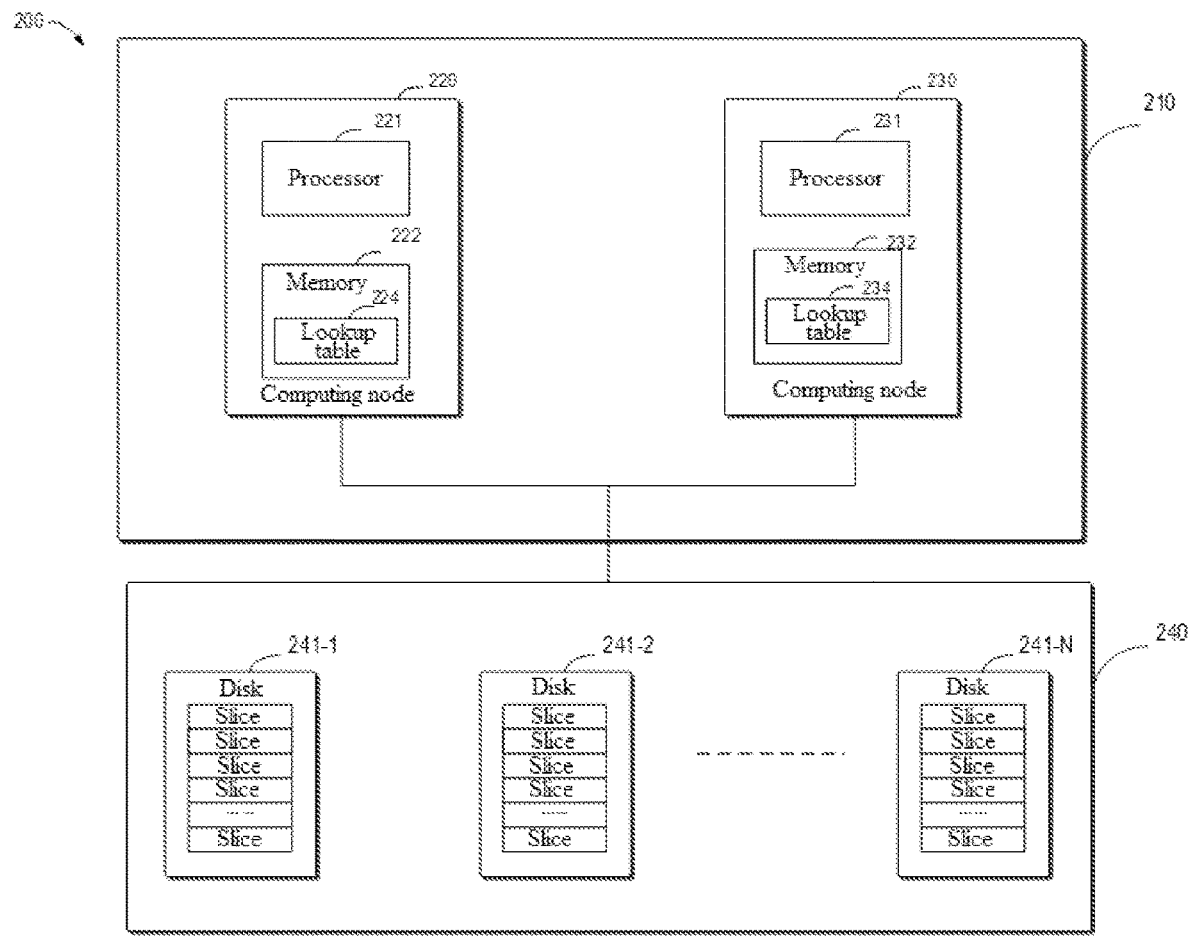
FIG. 2 shows a detailed block diagram of example environment 100 in which a device and/or a method according to an embodiment of the present disclosure may be implemented.

As shown in FIG. 2, data accessing device 210 of system 200 may include computing nodes 220 and 230. Each computing node includes a corresponding processor and a corresponding memory. That is, computing node 220 includes processor 221 and memory 222, and computing node 230 includes processor 231 and memory 232. Further, memory 222 and memory 232 store lookup tables respectively, e.g., memory 222 stores lookup table 224, and memory 232 stores lookup table 234. The lookup tables store information indicating data loss in disk array 240. In an embodiment, the lookup tables stored in memory 222 and memory 232 are mirrored. That is, lookup table 224 and lookup table 234 are mirrored. Therefore, when a lookup table at a computing node has problems, the table data may be restored based on the mirrored lookup table.

For disk array 240 that includes a redundant array of independent disks (RAID), either of computing nodes 220 and 230 in data accessing device 210 may run a RAID module in their respective processors for managing data in disk array 240.

Figure 3:
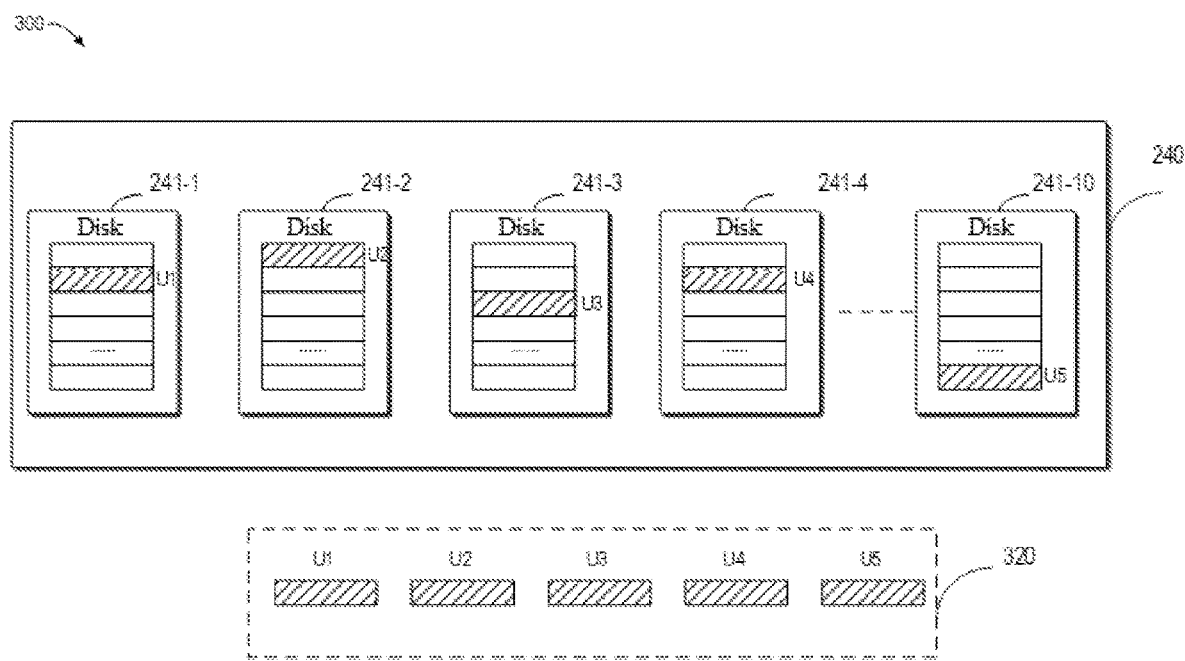
FIG. 3 schematically shows a schematic diagram of a RAID 5 array built based on slices in disks according to an embodiment of the present disclosure.

One type of RAID is built based on a complete physical disk. This type of RAID N array includes N physical disks, and one array will consume storage spaces of occupied N disks to store data and check information. Another type of RAID array is built on the basis of slices in the disks. RAID 5 will be taken as an example for description below with reference to FIG. 3. FIG. 3 schematically shows a schematic diagram of RAID 5 built based on slices in disks according to an embodiment of the present disclosure. In FIG. 3, disk array 240 including 10 disks 241-1 to 241-10 is taken as an example for description. However, it should be understood that this is only for ease of description, and does not imply any limitation to the scope of the present disclosure. The embodiments of the present disclosure may be applied to a disk array including other numbers of disks. As shown in FIG. 3, in order to build slice-based RAID 5, a RAID module may select 5 disks from the 10 disks, and select 1 slice from each of the selected disks, thus forming RAID 5 array 320. For example, the RAID module may select second slice U1 of first disk 241-1 (as shown by a shaded slice), first slice U2 of second disk 241-2 (as shown by a shaded slice), third slice U3 of third disk 241-3 (as shown by a shaded slice), second slice U4 of fourth disk 241-4 (as shown by a shaded slice), and second slice U5 of tenth disk 241-10 (as shown by a shaded slice), thus forming RAID 5 uber 320. RAID 5 uber may include 5 slices, of which 4 slices are data slices, and 1 slice is a check slice. Disk array 240 may include a plurality of RAID 5 ubers.

However, it should be understood that this is only for ease of description, and does not imply any limitation to the scope of the present disclosure. The embodiments of the present disclosure may be applied to other types of RAIDs with other layouts. Further, the method for accessing data according to the embodiments of the present disclosure may be applied to various types of RAIDs.

Figure 4:
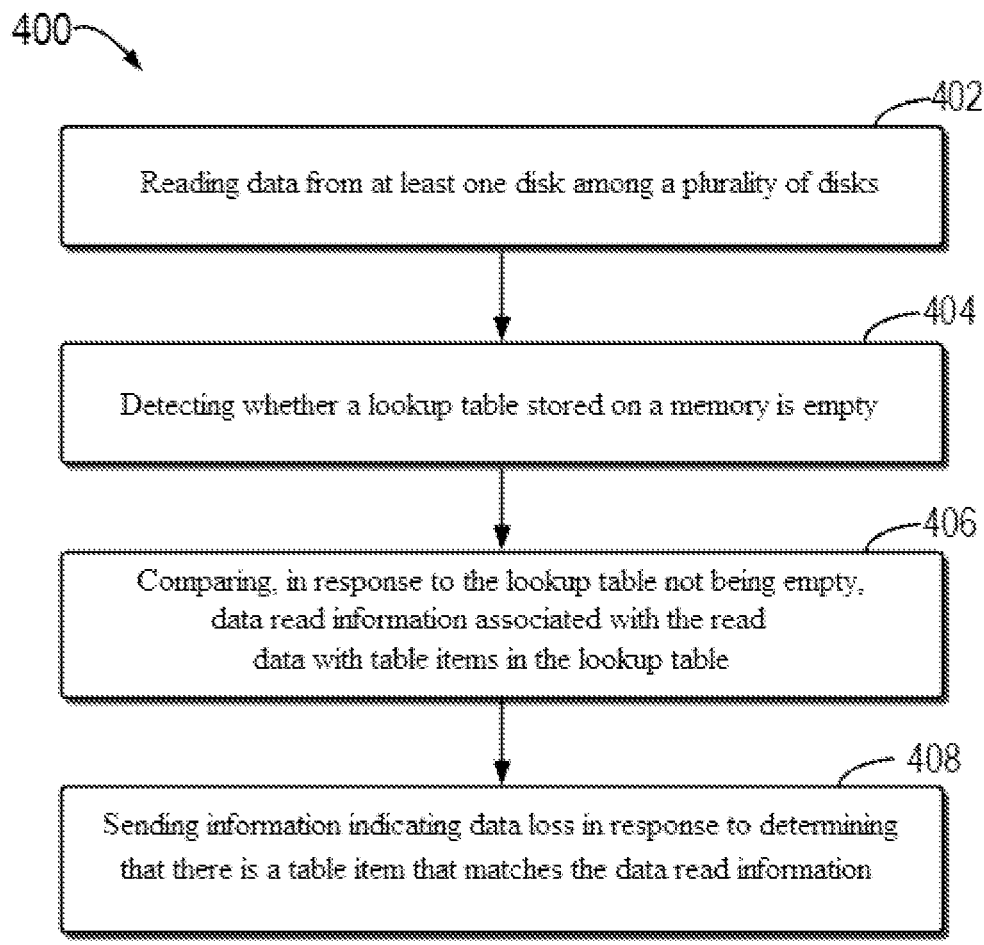
FIG. 4 shows a schematic flow chart of method 400 for accessing data according to an embodiment of the present disclosure.

FIG. 4 shows a flow chart of method 400 for accessing data of a redundant array of independent disks (RAID) according to an embodiment of the present disclosure. Actions involved in method 400 are described below with reference to storage system 200 as shown in FIG. 2. For example, in some embodiments, method 400 may be executed by data accessing device 210. Specifically, it may be executed by any computing node (referred to as "executing computing node") in data accessing device 210, and more specifically, it may be executed by a RAID module (not shown) running on a processor in an executing computing node. In addition, method 400 is described below with disk array 240 as an object, and it should be understood that method 400 may further include an additional action that is not shown and/or may omit an action that is shown, and the scope of the present disclosure is not limited in this respect.

At block 402, data accessing device 210 reads data from at least one disk among a plurality of disks. In an embodiment, data accessing device 210 performs data accessing for a disk in disk array 240. Taking RAID 5 uber 320 built based on slices in FIG. 3 as an example, the RAID 5 uber includes 5 slices, of which 4 slices are data slices, and 1 slice is a check slice. Data accessing device 210 reading data from a slice may be regarded as reading data from a disk in which the corresponding slice is located. For example, data accessing device 210 may read data of first slice U1 in RAID 5 uber 320, which, accordingly, is regarded as reading data from first disk 241-1.

At block 404, data accessing device 210 detects whether a lookup table stored on a memory is empty. In an embodiment, data accessing device 210 is provided with dual computing nodes, i.e., the data accessing device includes computing node 220 and computing node 230. Further, either computing node includes a memory. The RAID module executing the method detects whether the lookup table stored on the memory at the computing node where the RAID module is located is empty.

In an embodiment, the lookup table stores information indicating data loss. A lookup table is stored in a memory at each computing node in data accessing device 210, and these lookup tables are mirrored. For example, first lookup table 224 is stored in memory 222, second lookup table 234 is stored in memory 232, and first lookup table 224 and second lookup table 234 are mirrored.

The lookup table may be a table in hash format. Table items are provided in the lookup table, where each table item includes at least one of a position of lost data, a timestamp of the loss, and a size of the lost data. When there is data in the lookup table, for example, there is recorded data in the table item, it means that the lookup table is not empty. When there is no data in the lookup table, the lookup table is empty.

At block 406, data accessing device 210 compares, in response to the lookup table not being empty, data read information associated with the read data with table items in the lookup table to determine whether there is a table item in the lookup table that matches the data read information.

In an embodiment, in response to the lookup table not being empty as determined at block 404, data accessing device 210 compares the data read information associated with the read data with table items in the lookup table to determine whether there is a table item in the lookup table that matches the data read information. The data read information associated with the data may include information such as data addresses and data indexes. Thus, data accessing device 210 may determine whether there is a table item in the lookup table that matches the data read information by comparing the information such as data addresses and data indexes. In an embodiment, data accessing device 210 may acquire the data read information associated with the data prior to reading the data, or may acquire the data read information associated with the data while reading the data, or may acquire the data read information associated with the data after reading the data. Data accessing device 210 may set the sequence of acquiring the data and acquiring the data read information associated with the data based on actual requirements of the data accessing system, which is not limited in the present disclosure.

At block 408, information indicating data loss is sent in response to determining that there is a table item that matches the data read information.

The existence of a table item matching the data read information means that information associated with the read data is stored in the lookup table, indicating that the data in a slice corresponding to the read data is lost. For example, it is determined that there is a matching item by comparing an address in a table item with an address in the data read information, indicating that the data at the address is lost.

With the method, only when the lookup table is not empty, does the data accessing device need to further determine whether there is lost data. Since it is not necessary to perform template comparison every time when data is accessed, the method for accessing data according to the embodiment of the present disclosure can improve the efficiency of data accessing. In addition, the lookup table may be recorded by the RAID module in the rebuilding process without the involvement of other modules. Therefore, the method for accessing data according to the embodiment of the present disclosure can be independently completed by the RAID, thereby reducing the complexity of the system, reducing the power consumption of the system, and improving the performance of the system.

In an embodiment, when it is detected at block 402 that the lookup table stored on the memory is empty, data accessing device 210 determines that the read data is correct and directly sends the data to an upper-level device for processing.

In an embodiment, at block 406, when it is determined that there is no table item matching the data read information, data accessing device 210 may determine that, although the lookup table not being empty indicates that there is lost data in the disk array, the read data is correct data because the read data does not match any one item in the lookup table. In this case, data accessing device 210 may send the read data to an upper-level device for processing.

Figure 5:
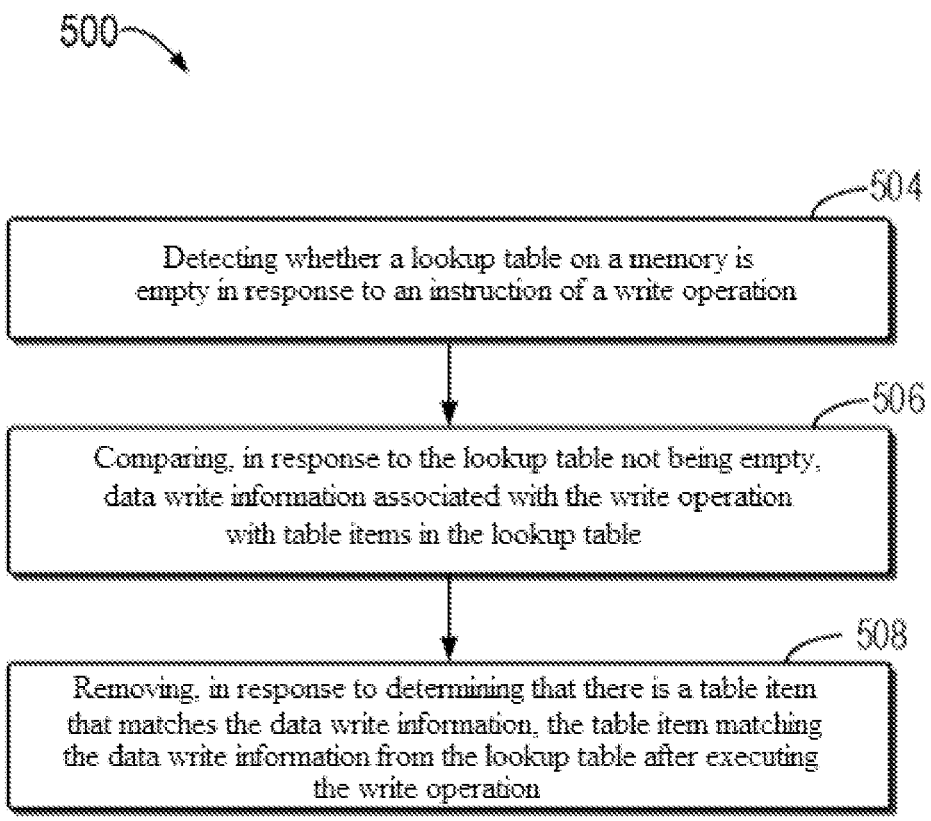
FIG. 5 schematically shows a schematic flow chart of method 500 for a write operation according to an embodiment of the present disclosure.

FIG. 5 schematically shows a schematic flow chart of method 500 for a write operation according to an embodiment of the present disclosure. Actions involved in method 500 are described below with reference to storage system 200 as shown in FIG. 2. For example, in some embodiments, method 500 may be executed by data accessing device 210. Specifically, it may be executed by any computing node (referred to as "executing computing node") in data accessing device 210, and more specifically, it may be executed by a RAID module (not shown) running on a processor in an executing computing node. In addition, method 500 is described below with disk array 240 as an object, and it should be understood that method 500 may further include an additional action that is not shown and/or may omit an action that is shown, and the scope of the present disclosure is not limited in this respect. In some embodiments, method 500 may be executed based on method 400 in FIG. 4. In some embodiments, method 500 may also be executed prior to or concurrently with method 400 in FIG. 4. The sequence of executing method 400 and method 500 is not limited in the present disclosure.

At block 504, data accessing device 210 detects, in response to an instruction of a write operation, whether a lookup table on a memory is empty. The implementation of detecting whether the lookup table on the memory is empty in this step is similar to the implementation at block 404, and for the sake of brevity, the description will not be repeated here.

At block 506, data accessing device 210 compares, in response to the lookup table not being empty, data write information associated with the write operation with table items in the lookup table. In an embodiment, the data write information may include a write operation address, written data, other associated information, and the like. When the data write information includes a write operation address, data accessing device 210 may compare the write operation address with data addresses of the table items in the lookup table to determine whether there is a table item that matches the write operation address.

At block 508, data accessing device 210 removes, in response to determining that there is a table item that matches the data write information, the table item matching the data write information from the lookup table after executing the write operation.

It is understandable that when the data write information includes a write operation address, if a table item matching the write operation address is stored in the lookup table, it means that data corresponding to the address is lost. Accordingly, the write operation of data accessing device 210 may write correct data into the address, and thus, data at the address is restored. Accordingly, after executing the write operation, data accessing device 210 removes the table item matching the data write information from the lookup table, indicating that the lost data has been restored, and accordingly, the lookup table is also updated.

With the above method, the lookup table may be updated, such that information indicating the data loss will no longer be recorded in the lookup table after data restoration, and thus information of the lookup table is more accurate and real-time.

Figure 6:
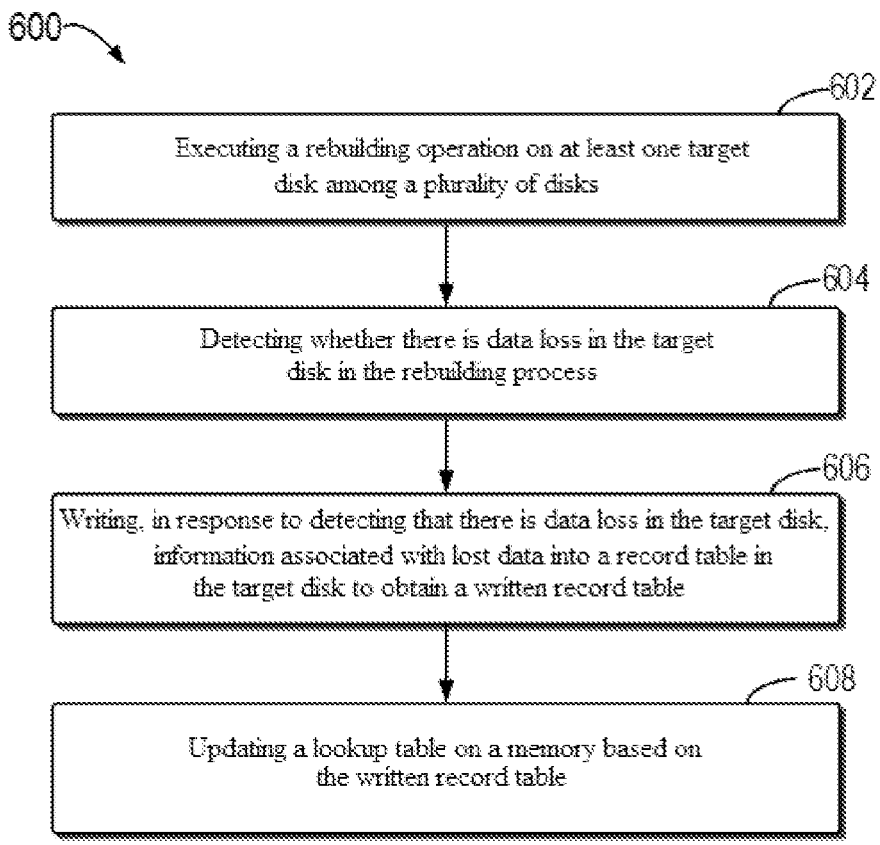
FIG. 6 schematically shows a schematic flow chart of method 600 for establishing and maintaining a lookup table according to an embodiment of the present disclosure.

A process of establishing and maintaining the lookup table will be described below with reference to FIG. 6. FIG. 6 shows a flow chart of method 600 for updating a record table according to an embodiment of the present disclosure. For example, in some embodiments, method 500 may be executed by data accessing device 210. Specifically, it may be executed by any computing node (referred to as "executing computing node") in data accessing device 210, and more specifically, it may be executed by a RAID module (not shown) running on a processor in an executing computing node. In addition, method 600 is described below with disk array 240 as an object, and it should be understood that method 600 may further include an additional action that is not shown and/or may omit an action that is shown, and the scope of the present disclosure is not limited in this respect.

At block 602, data accessing device 210 executes a rebuilding operation on at least one target disk among a plurality of disks. For example, data accessing device 210 executes the rebuilding operation on target disk 241-1 in disk array 240.

At block 604, data accessing device 210 detects whether there is data loss in the at least one target disk in the rebuilding process. For example, data accessing device 210 detects whether there is data loss in disk 241-1. For example, when some data on other disks has problems, some data in disk 241-1 may not be effectively restored, thereby resulting in data loss.

At block 606, data accessing device 210 writes, in response to detecting that there is data loss in the at least one target disk, information associated with the lost data into a record table in the at least one target disk to obtain a written record table. For example, when data accessing device 210 detects data loss in target disk 241-1, data accessing device 210 writes the information associated with the lost data (including but not limited to at least one of a position of the lost data, a timestamp of the loss, and a size of the lost data) into a record table in target disk 241-1. The record table may be a hash table and may be in the same format as lookup table stored in memory 222 and lookup table 234 stored in memory 232.

Since the record table is stored in a disk, and the disk is non-volatile, the record table is also a table that is permanent in a non-volatile memory, such that data in the table will not be erased due to, e.g., power failure. Thus, when a lookup table in a memory is erased due to, e.g., power failure, the record table stored on the disk may be provided to generate the lookup table in the memory for restoring data in table items in the lookup table.

At block 608, data accessing device 210 updates a lookup table on a memory based on the written record table on the disk. For example, the data accessing device may look up a table in the memory using various techniques and based on the written record table, such that the table in the memory is accurately updated in real time based on whether there is lost data in the disk.

In an embodiment, for lookup tables in two memories in data accessing device 210, the sequence of updating the lookup tables is not limited in the present disclosure. For example, data accessing device 210 may first update lookup table 224 in memory 222 in computing node 220, and then update lookup table 234 in access memory 232 based on updated lookup table 224 in memory 222. Alternatively, data accessing device 210 may first update lookup table 234 in memory 232 in computing node 230, and then update lookup table 224 in access memory 222 based on updated lookup table 234 in memory 232. The sequence of updating tables in memories is not limited in the present disclosure.

In an embodiment, with reference to method 500 for a write operation described in FIG. 5 and before the RAID module removes a matching table item from a lookup table in a memory, the RAID module may first remove the matching table item from a record table stored in a disk into which data is written, and then update mirrored lookup tables 224 and 234 respectively, such that all the table items in the record table and in the mirrored lookup tables can accurately reflect data loss in a RAID.

In addition, in an embodiment, data accessing device 210 may further read a record table stored in each disk, and detect whether data of table items in the record table reaches a threshold. When the data of the table items in the record table does not reach the threshold, it indicates that data loss of the disk may be tolerated. When the number of table items in the record table reaches a threshold, it indicates that data loss of the disk cannot be tolerated, and data accessing device may troubleshoot the disk storing the record table. Alternatively, data accessing device 210 may also inform other devices to, e.g., troubleshoot the disk.

With the method, only when the lookup table is not empty, does the data accessing device need to further determine whether there is lost data. Since it is not necessary to perform template comparison every time when data is accessed, the method for accessing data according to the embodiment of the present disclosure can improve the efficiency of data accessing. In addition, the lookup table may be recorded by the RAID module in the rebuilding process without the involvement of other modules. Therefore, the method for accessing data according to the embodiment of the present disclosure can be independently completed by the RAID, thereby reducing the complexity of the system, reducing the power consumption of the system, and improving the performance of the system.

Figure 7:
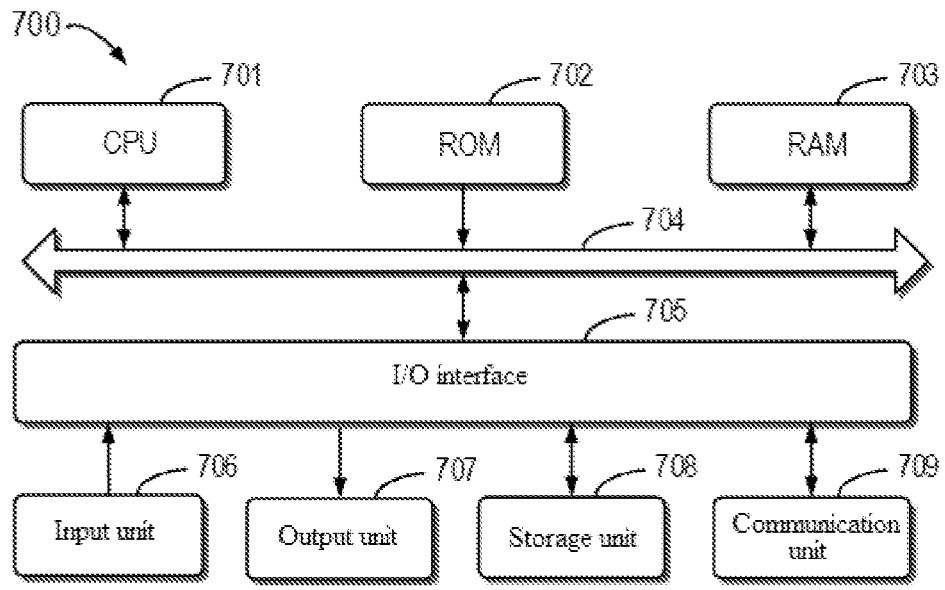
FIG. 7 shows a schematic block diagram of example device 700 adapted to implement embodiments of contents of the present disclosure.

FIG. 7 shows a schematic block diagram of example device 700 that may be configured to implement embodiments of the present disclosure. The computing nodes in FIG. 1 and FIG. 2 may be implemented using device 700. As shown in the figure, device 700 includes central processing unit (CPU) 701, which may execute various appropriate actions and processes in accordance with computer program instructions stored in read-only memory (ROM) 702 or computer program instructions loaded into random-access memory (RAM) 703 from storage unit 708. RAM 703 may further store various programs and data required by operations of device 700. CPU 701, ROM 702, and RAM 703 are connected to each other through bus 504. Input/output (I/O) interface 705 is also connected to the bus 704.

A number of components in device 700 are connected to I/O interface 705, including: input unit 706, such as a keyboard or a mouse; output unit 707, such as various types of displays or speakers; memory page 708, such as a disk or an optical disk; and communication unit 709, such as a network card, a modem, or a wireless communication transceiver. Communication unit 709 allows device 700 to exchange information/data with other devices via a computer network such as the Internet and/or various telecommunication networks.

The various processes and processing described above, for example, methods 400, 500, and 600, may be executed by processing unit 701. For example, in some embodiments, method 400, 500, or 600 may be embodied as a computer software program that is tangibly included in a machine-readable medium, such as storage unit 708. In some embodiments, some or all of the computer programs may be loaded and/or installed onto device 700 via ROM 702 and/or communication unit 709. When the computer program is loaded into RAM 703 and executed by CPU 701, one or more actions of methods 400, 500, and 600 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction executing device. For example, the computer-readable storage medium may be, but is not limited to, an electric storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random-access memory (RAM), a read-only memory (ROM), an erasable programmable read-only memory (EPROM or flush memory), a static random-access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the above. The computer-readable storage medium used herein is not interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wire.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operations of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the "C" language or similar programming languages. The computer-readable program instructions may be executed entirely on a user computer, partly on a user computer, as a stand-alone software package, partly on a user computer and partly on a remote computer, or entirely on a remote computer or a server. In the case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus, the computer-readable medium storing instructions includes an article of manufacture that includes instructions implementing various aspects of the functions/actions specified in one or more blocks in the flow charts and/or block diagrams.

The computer-readable program instructions may also be loaded onto a computer, other programmable data processing apparatuses, or other devices, such that a series of operation steps may be executed on the computer, the other programmable data processing apparatuses, or the other devices to produce a computer-implemented process, and such that the instructions executed on the computer, the other programmable data processing apparatuses, or the other devices may implement the functions/actions specified in one or more blocks in the flow charts and/or block diagrams.

The flow charts and block diagrams in the figures show the architectures, functions, and operations of possible implementations of the systems, methods, and computer program products according to various embodiments of the present disclosure. In this regard, each block in the flow charts or block diagrams may represent a module, a program segment, or portion of an instruction, the module, the program segment, or the portion of the instruction including one or more executable instructions for implementing specified logical functions. In some alternative implementations, functions annotated in the blocks may also occur in an order different from the order annotated in the figures. For example, two successive blocks may actually be executed substantially in parallel, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the technological improvements to technologies on the market, or to enable other persons of ordinary skill in the art to understand the embodiments disclosed herein.

The invention claimed is:

1. A method for accessing data of a redundant array of independent disks (RAID), wherein the redundant array of independent disks comprises a plurality of disks, the plurality of disks being associated with a data accessing device, the method being executed by the data accessing device, the method comprising:
reading data from at least one disk among the plurality of disks;
detecting whether a lookup table stored on a memory is empty, the lookup table storing information indicating data loss;
comparing, in response to detecting that the lookup table is not empty, data read information associated with the read data with table items in the lookup table to determine whether there is a table item in the lookup table that matches the data read information; and
sending, in response to determining that there is a table item that matches the data read information, the information indicating data loss.

2. The method according to claim 1, further comprising:
prior to the lookup table becoming not empty, sending the read data in response to detecting that the lookup table is empty.

3. The method according to claim 1, further comprising:
prior to there being a table item that matches the data read information, sending the read data in response to determining that there is no table item that matches the data read information.

4. The method according to claim 1, wherein the data read information comprises a read address of the read data from the at least one disk.

5. The method according to claim 1, further comprising: detecting whether the lookup table is empty in response to an instruction of a write operation; comparing, in response to detecting that the lookup table is not empty, data write information associated with the write operation with table items in the lookup table to determine whether there is a match of the data write information; and removing, in response to determining that there is a match of the data write information, the table item matching the data write information from the lookup table after executing the write operation, wherein the data write information comprises a write operation address for performing a write operation on the at least one disk.

6. The method according to claim 1, further comprising:
executing a rebuilding operation on at least one target disk among the plurality of disks;
detecting whether there is data loss in the at least one target disk in the rebuilding operation; and
writing, in response to detecting that there is data loss in the at least one target disk, information associated with lost data into a record table in the at least one target disk to obtain a written record table.

7. The method according to claim 6, further comprising:
updating the lookup table stored on the memory based on the written record table.

8. The method according to claim 7, wherein the memory is a first memory, the lookup table is a first lookup table, the data accessing device further comprises a second memory, and the method further comprises:
updating a second lookup table stored in the second memory based on the written record table,
wherein the first lookup table and the second lookup table are configured as mirror images of each other.

9. The method according to claim 6, further comprising:
troubleshooting, when a number of table items in the record table reaches a threshold, the at least one target disk storing the record table.

10. The method according to claim 1, wherein each table item in the lookup table comprises at least one of a position of lost data, a timestamp of the data loss, and a size of the lost data.

11. An electronic device for accessing data of a redundant array of independent disks (RAID), wherein the redundant array of independent disks comprises a plurality of disks, the plurality of disks being associated with the electronic device, the electronic device comprising:
at least one processor; and
a memory coupled to the at least one processor and having instructions stored thereon, wherein the instructions, when executed by the at least one processor, cause the electronic device to execute actions, and the actions comprise:
reading data from at least one disk among the plurality of disks;
detecting whether a lookup table stored on the memory is empty, the lookup table storing information indicating data loss;
acquiring, in response to detecting that the lookup table is not empty, data read information associated with the read data, and comparing the data read information associated with the read data with table items in the lookup table to determine whether there is a table item in the lookup table that matches the data read information; and
sending, in response to determining that there is a table item that matches the data read information, the information indicating data loss.

12. The electronic device according to claim 11, wherein the instructions, when executed by the at least one processor, further cause the electronic device to:
prior to the lookup table becoming not empty, send the read data in response to detecting that the lookup table is empty.

13. The electronic device according to claim 11, wherein the instructions, when executed by the at least one processor, further cause the electronic device to:
prior to there being a table item that matches the data read information, send the read data in response to determining that there is no table item that matches the data read information.

14. The electronic device according to claim 11, wherein the data read information comprises a read address of the read data from the at least one disk.

15. The electronic device according to claim 11, wherein the instructions, when executed by the at least one processor, further cause the electronic device to:
- detect whether the lookup table is empty in response to an instruction of a write operation;
- compare, in response to detecting that the lookup table is not empty, data write information associated with the write operation with table items in the lookup table to determine whether there is a match of the data write information; and
- remove, in response to determining that there is a match of the data write information, the table item matching the data write information from the lookup table after executing the write operation,
- wherein the data write information comprises a write operation address for performing a write operation on the at least one disk.

16. The electronic device according to claim 11, wherein the instructions, when executed by the at least one processor, further cause the electronic device to:
- execute a rebuilding operation on at least one target disk among the plurality of disks;
- detect whether there is data loss in the at least one target disk in the rebuilding operation; and
- write, in response to detecting that there is data loss in the at least one target disk, information associated with lost data into a record table in the at least one target disk to obtain a written record table.

17. The electronic device according to claim 16, wherein the instructions, when executed by the at least one processor, further cause the electronic device to:
- update the lookup table stored on the memory based on the written record table.

18. The electronic device according to claim 17, wherein the memory is a first memory, the lookup table is a first lookup table, the electronic device further comprises a second memory, and the instructions, when executed by the at least one processor, further cause the electronic device to:
- update a second lookup table stored in the second memory based on the written record table,
- wherein the first lookup table and the second lookup table are configured as mirror images of each other.

19. The electronic device according to claim 16, wherein the instructions, when executed by the at least one processor, further cause the electronic device to:
- troubleshoot, when a number of table items in the record table reaches a threshold, the at least one target disk storing the record table.

20. The electronic device according to claim 11, wherein each table item in the lookup table comprises at least one of a position of lost data, a timestamp of the data loss, and a size of the lost data.

21. A computer program product having a non-transitory computer readable medium which stores a set of instructions to access data of a redundant array of independent disks (RAID) which includes a plurality of disks, the plurality of disks being associated with a data accessing device; the set of instructions, when carried out by the data accessing device, causing the data accessing device to perform a method of:
- reading data from at least one disk among the plurality of disks;
- detecting whether a lookup table stored on a memory is empty, the lookup table storing information indicating data loss;
- comparing, in response to detecting that the lookup table is not empty, data read information associated with the read data with table items in the lookup table to determine whether there is a table item in the lookup table that matches the data read information; and
- sending, in response to determining that there is a table item that matches the data read information, the information indicating data loss.

* * * * *